United States Patent Office 2,853,777
Patented Sept. 30, 1958

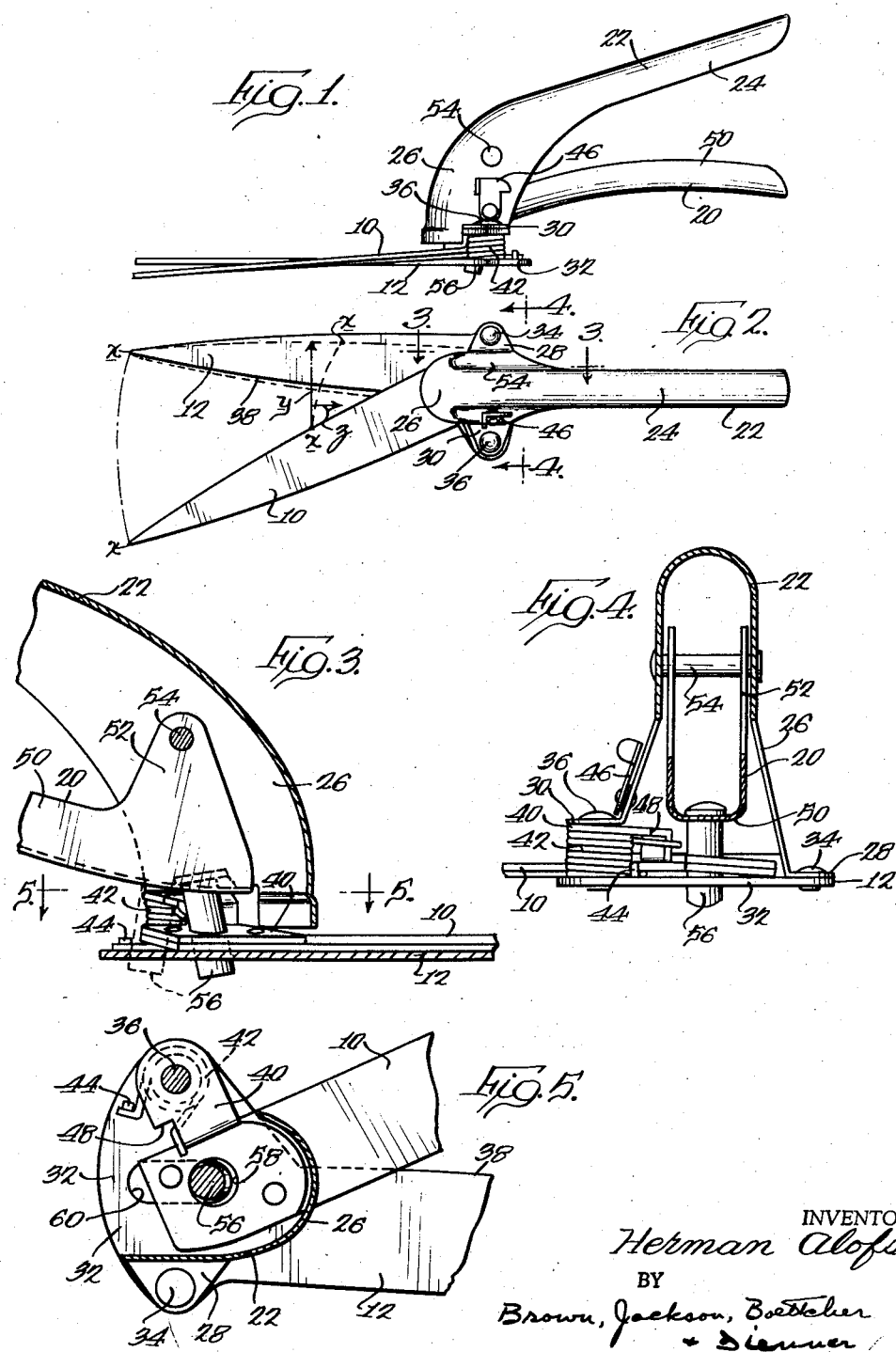

2,853,777

GRASS SHEARS

Herman Alofs, Grand Rapids, Mich., assignor to Midwest Tool & Cutlery Company, Sturgis, Mich., a corporation of Michigan Application November 6, 1957, Serial No. 694,793

5 Claims. (Cl. 30—248)

The present invention relates to grass shears, and particularly, to improved means for producing a highly efficient cutting action in grass shears and the like.

The cutting action afforded according to the present invention is attained essentially by first tilting the cutting edge of one blade of the shears into engagement with the cutting edge of the other blade, second, firmly pressing the cutting edge of the tilted blade into engagement with the cutting edge of the other blade during the cutting action, and third causing the blades to effect not only their conventional transverse movement but a relative draw movement longitudinally of their cutting edges as well. By virtue of these characteristics, the cutting edges of the blades have optimum cooperation and are self-sharpening, the pressure of blade engagement is generally proportional to the resistance to cutting, and the blades combine the conventional cross cut of a shears or scissors with the slicing cut of a knife.

The object of the present invention is to provide simplified means of economical construction for producing the efficient cutting action above described.

More specifically, it is an object of my invention to provide an improved grass shears including a pair of relatively movable blades, means pivotally and tiltably mounting one of the blades on an axis spaced laterally in front of the cutting edge of the other blade, and means for applying a force to said one blade transversely of the plane of said one blade at a location spaced from said pivot axis and for simultaneously applying a force longitudinally of the shears to said one blade, said last named means applying said force transversely of said one blade in the direction to tilt the cutting edge of said one blade into engagement with the cutting edge of said other blade, whereby said one blade is caused to tilt, is pressed at its cutting edge into engagement with the cutting edge of the other blade and in moving relative to the other blade about its pivot has components of movement both transversely and longitudinally of the cutting edge of said other blade.

A further object of the invention is to provide an improved grass shears including a relatively fixed first blade and first handle assembly, a second handle movable relative to the first handle in a vertical plane and a second blade disposed immediately above and movable relative to the first blade in a horizontal plane, means pivotally mounting the second blade at a location elevated from its cutting edge and spaced laterally from the cutting edge of the first blade to the side of the second blade opposite its cutting edge, and means on said second handle engaging said second blade at a location spaced from its pivotal mounting to the side of said pivotal mounting adjacent the cutting edge of the first blade for exerting, upon movement of said second handle towards said first handle, both a downward force and a force longitudinally rearward of said handles on the portion of the second blade engaged thereby.

A still further object of the invention is the provision, without sacrifice of blade and handle length, of a relatively short and well balanced grass shears. Specifically, it is my objective to extend the forward portion of the handles of the shears over the rearward portions of the blades to shorten the overall length of the shears and locate the bulk of the weight of the shears close to the user's hands, thereby to mitigate fatigue of the user's hand and wrist.

Other objects and advantages of the invention will become apparent in the following detailed description of a preferred embodiment of the invention.

Now, in order to acquaint those skilled in the art with the manner of making and using the improved grass shears of my invention, I shall describe, in connection with the accompanying drawing, a preferred embodiment of my invention, and a preferred manner of making the same.

In the drawing:

Figure 1 is a side elevation of my improved grass shears;

Figure 2 is a plan view of the shears;

Figure 3 is an enlarged fragmentary vertical section of the shears taken substantially on line 3—3 of Figure 2;

Figure 4 is a similarly enlarged vertical cross section taken substantially on line 4—4 of Figure 2; and Figure 5 is a fragmentary horizontal section taken substantially on line 5—5 of Figure 3.

Referring to the drawing, and particularly to Figures 1 and 2, I have shown the preferred embodiment of my grass shears as including a pair of blades 10 and 12 movable relative to one another in the horizontal plane and a pair of handles 20 and 22 movable relative to one another in the vertical plane and in upwardly spaced relation to the plane of the blades. The lower one of the handles, i. e., the handle 20, is operatively connected to the upper one of the blades, i. e., the blade 10, for purposes of actuating the same, and the lower blade 12 is secured to the upper handle 22 to constitute therewith a fixed assembly.

In the fixed assembly of upper handle and lower blade, I prefer to form the upper handle as a one-piece sheet metal stamping including a rearwardly and upwardly inclined hand grip portion 24 of inverted U-shape, and a depending forwardly disposed housing portion 26 which adjacent its lower end approaches a parti-cylindrical form. Due to such formation, the housing portion 26 is rearwardly open and includes downwardly divergent leg portions, as shown in Figure 4, one of which extends downwardly beyond the lower edge of the housing per se and the other of which terminates above said edge. At their lower extremities, the said legs include laterally outwardly extending tabs 28 and 30, respectively, which are thus disposed in vertically spaced relation to one another.

The lower blade 12 is an integral member, suitably formed of steel, including an enlarged portion 32 at its rearward end conforming generally to the configuration of the lower end of the housing portion 26. The blade 12 is fixedly secured at said portion 32 thereof to the upper handle in a plane immediately below the lower one 28 of the tabs by means of a rivet 34 or the like connecting the blade to the lower tab 28 and a pivot pin 36 rigidly connecting the blade in downwardly spaced relation to the upper tab 30. As shown in Figures 2 and 5, the lower blade 12 includes a blade portion projecting forwardly from the housing porton 26 in a direction generally longitudinally of the handles. According to the present invention, this portion of the blade is provided with a cutting edge 38 that faces toward and is spaced laterally from the pin 36.

The upper blade 10 includes a generally similar but opposed blade portion and the two blades are curved transversely of the planes thereof, as shown in Figure 1, to insure a self-sharpening action. Also, the opposed cutting edges of the blades are preferably formed on opposed arcs to insure a single point of cut at all times, thereby to apply maximum cutting force to a limited area in use of the shears.

At its rearward end, the upper blade 10 projects between the lower blade 12 and the housing portion 26 and carries a transverse lug 40 that extends laterally away and upwardly from the cutting edges of the blades toward the pin 36. The lug 40 preferably includes a first planar portion secured to the upper surface of the upper blade, an upwardly extending vertical portion and a second planar portion which extends outwardly to the pin 36 immediately below the upper supporting tab 30. This latter portion of the lug 40 is provided adjacent its outer end with an enlarged hole through which the pin 36 freely extends, whereby the lug 40 pivotally and tiltably mounts the upper blade 10 on the pin 36 for movement about an axis spaced laterally in front of the cutting edge 38 of the lower blade, i. e., in laterally spaced relation from said cutting edge to the side of the upper blade opposite its cutting edge. Due to the fact that the major portion of the upper blade is spaced from its pivotal mounting, the blade will normally tilt downwardly about the pin 36 in the manner shown in Figure 4, whereby the cutting edge of the upper blade is normally tilted into engagement with the cutting edge of the lower blade. Due to the fact that the location of the pivotal mounting is spaced upwardly from the blade, the tilting action is enhanced.

To impart a normal biasing force to the blades, i. e., the movable blade 10, a torsion spring 42 is provided. According to the improved economical assembly of the invention, this spring encircles and is retained in place by the pivot pin 36, and the spring is disposed between the lower blade 12 and the outer end of the lug 40 to maintain the lug in its elevated position. The spring includes opposite end portions which bear, respectively, against the vertical portion of the lug 40 and a pin 44 fixed to the portion 32 of the lower blade, thereby normally to bias the upper blade to open or spread position.

For storage purposes, it is usually preferred that the blades be closed, and I therefore provide latch means for retaining the blade in closed position against the normal bias of the spring 42. This means comprises, simply, a latch 46 pivotally mounted on the side of the upper handle 22 immediately above the lug 40, the lug being stepped to provide a shoulder 48 behind which the latch may engage to hold the blade 10 in closed position. The latch is thus also disposed immediately adjacent the thumb of the user's hand whereby locking and unlocking of the shears is greatly facilitated. To retain the latch against inadvertent movement, I prefer to dispose a spring washer between the handle wall and the latch, frictionally to hold the latch in the position to which last moved.

The lower or blade actuating handle 20 preferably comprises a unitary sheet metal stamping of U-shape in cross section defining a hand grip portion 50 at its rearward end and including at its forward end a pair of aligned upstanding tabs 52. The forward end portion of the lower handle extends into the housing portion 26 of the upper handle 22 and is pivotally mounted therein by means of a horizontal pivot pin 54 extending through said tabs and the side walls of the upper handle. At the forward end thereof the base wall of the lower handle carries a downwardly extending actuator pin 56 which projects through a hole 58 in the upper blade 10 and/or its mounting lug 40 for purposes of actuating the blade in the horizontal plane upon movement of the lower handle in the vertical plane.

As will be obvious to those skilled in the art, the above described construction of a shears is highly economical and insures long life of the shears despite exceedingly rough usage. The shears embodies a minimum number of moving parts and the connections of the moving parts are in the form of simple pivots. The forward portions of the handles and the blade actuating means carried thereby overlie the rearward portions of the blades thereby to foreshorten the shears to the greatest extent possible without sacrifice of blade or handle length. This also results in a well balanced shears having the major portion of its weight located close to the user's hand thereby to mitigate operator fatigue.

However, the present invention goes considerably beyond the concept of an economical and practical shears, and so embodies the same as to afford the highly advantageous cutting action described hereinbefore. In this respect, one important feature of the invention is the tiltable and pivotal mounting of the movable or upper blade on an axis spaced laterally in front of the cutting edge of the stationary or lower blade. This feature, as above noted, results in a normal tilting of the cutting edge of the movable blade into the cutting edge of the stationary blade. Of equal importance is that this mounting compels the movable blade to move in an arc relative to the stationary blade such that the tip or any other point on the cutting edge of the movable blade swings laterally and rearwardly relative to the stationary blade as is indicated by the dotted lines X—X in Figure 2. This results in the cutting edges of the blades having both lateral and longitudinal components of relative movement, as indicated by Y and Z, respectively, whereby the blades perform not only a conventional scissors cut but a knife cut as well. Moreover, the knife cutting action is a draw cut relative to the stationary blade whereby cutting force tends to increase with increased resistance to cutting.

The other feature of the present invention leading to the highly advantageous cutting action is disposition of the actuator pin 56 in such position that the same in moving the upper blade to closed position exerts a pulling force on the rearward end portion of the movable blade longitudinally of the shears, and second, a downward force on the cutting edge of the upper blade, thereby to effect the draw cut under such pressure as will increase with increased cutting resistance. To this end, the pin 56 extends downwardly and forwardly relative to the upper blade when the blade is in open position and engages the blade at a location spaced from the pivotal mounting of the blade to the side of said pivotal mounting adjacent the cutting edge of the blade. In movement of the lower handle to closed position, the pin 56 is not moved an appreciable distance rearwardly beyond a vertical position whereby the pin 56 exerts components of force both downwardly on the cutting edge of the blade and rearwardly of the handles during closing movement of the blade.

In the preferred embodiment of the invention, the pivot axis of the lower handle is disposed in substantially intersecting relation to the pivot axis of the upper blade and the arc of handle movement is such that the pin does not move rearwardly appreciably beyond a vertical position. To insure this limited movement, the lower stationary blade is provided with a slot 60 therein extending along the longitudinal axis of the shears, the rearward margin of the slot being aligned substantially with the pivot pin 36 and the slot extending forwardly therefrom a distance corresponding to the necessary movement of the actuator pin 56. The hole 58 in the movable blade and its mounting lug is aligned with the slot 60, and the hole is of a diameter greater than the width of the slot to align with the slot throughout its path of movement despite the arcuate nature of such movement. The actuator pin 56 on the lower handle extends through the hole 58 and into the slot 60, whereby the pin is accurately guided and protected against transverse misalignment and whereby the opposite ends of the slot define the limits of blade and handle movement.

Due to the connection of the upper blade and lower handle, only the single biasing spring 42 is required normally to bias the handles and the blades to their relatively spread or open position. The natural tendency of the lower handle to gravitate downwardly facilitates this action. In addition, as the movable blade swings to open position, downward force, as applied thereto by the handle on the blade closing stroke, is relieved, whereby the upper blade can move vertically relative to the lower blade against the resistance of its own weight to insure full opening of the shears even though the blades may be covered with sticky grass juices and the like.

In view of the foregoing, it is to be appreciated that the hereinbefore stated objects are attained in full and that a highly advantageous cutting action is produced in an economical, convenient and practical manner by virtue of the present invention.

While I have described and shown what I regard to be the preferred embodiment of my invention, it is to be appreciated that various changes, rearrangements and modifications may be made therein without departing from the scope of the present invention, as defined by the appended claims.

I claim:

1. In a grass shears having a pair of relatively movable blades provided with opposed cutting edges, the improvement comprising pivot means mounting one of the blades for pivotal and tilting movement about a pivot axis spaced laterally in front of the cutting edge of the other blade, and actuating means for applying a force to said one blade transversely of the plane of said one blade at a location spaced from said pivot axis and for simultaneously applying a force longitudinally of the shears to said one blade, said actuating means applying said force transversely of said one blade in the direction to tilt the cutting edge of said one blade into engagement with the cutting edge of said other blade.

2. In a grass shears having a pair of blades movable relative to one another in the horizontal plane and a pair of handles movable relative to one another in the vertical plane, the upper one of the handles being fixed to the lower one of the blades, the improvement comprising means pivotally and tiltably mounting the upper one of the blades at a location spaced laterally from the cutting edge of the lower blade to the side of the upper blade opposite its cutting edge, and means on the lower handle for imparting a downward force and a force longitudinally rearward of the shears to said upper blade at a location spaced from its pivotal mounting to the side of said pivotal mounting adjacent the cutting edge of the lower blade.

3. In a grass shears having a fixed assembly of a horizontally disposed lower blade and a vertically disposed upper handle, an upper blade movable relative to the lower blade in the horizontal plane and a lower handle movable relative to the upper handle in the vertical plane, the improvement comprising a lug fixed adjacent one of its ends to the rearward end portion of the upper blade and extending at its other end upwardly from the plane of the upper blade and laterally away from the cutting edge of the lower blade, a pin pivotally and tiltably mounting said lug at its said other end on the said fixed assembly, and means on the lower handle engaging the upper blade adjacent its cutting edge for imparting to the upper blade a downward force and a force longitudinally rearward of the shears.

4. In a grass shears having a fixed assembly of a horizontally disposed lower blade and a vertically disposed upper handle, an upper blade movable relative to the lower blade in the horizontal plane and a lower handle movable relative to the upper blade in the vertical plane, the improvement comprising a lug fixed adjacent one of its ends to the rearward end portion of the upper blade and extending at its other end upwardly from the plane of the upper blade and laterally away from the cutting edge of the lower blade, a pin pivotally and tiltably mounting said lug at its said other end on the said fixed assembly, the lower blade having a slot therein extending from adjacent the location of said pin longitudinally forward of the shears in laterally spaced relation to said pin, the upper blade having a hole therethrough aligned with said slot, and an actuator pin extending downwardly from the lower handle through said hole into said slot, said slot defining the limits of movement of said actuator pin and thus of the lower handle and the upper blade, said actuator pin when engaging in the forward end portion of said slot extending downwardly and forwardly relative to the blade and being movable rearwardly by the lower handle for applying to the upper blade a downward force and a force longitudinally rearward of the shears.

5. A grass shears comprising an upper handle having a downwardly extending housing portion at its forward end and a pair of mounting tabs extending laterally outward from opposite sides of said housing portion adjacent the lower end thereof, one of said tabs being spaced upwardly from the plane of the other tab, a lower blade extending beneath said housing portion at the rearward end thereof immediately below the plane of the lower tab, means fixedly securing said lower blade to said tabs including a pin extending between the upper one of said tabs and said lower blade, said lower blade having a longitudinal cutting edge facing toward and spaced laterally from said pin, an upper blade disposed immediately above said lower blade and extending beneath said housing portion at its rearward end, a mounting lug secured to the rearward end of said upper blade and extending upwardly and laterally therefrom toward the upper one of said tabs, said lug adjacent its upper outer end being pivotally and tiltably mounted on said pin below the upper one of said tabs, said upper blade having a longitudinal cutting edge along the margin thereof opposite said pin opposed to the cutting edge of said lower blade, a torsion spring encircling said pin between said lug and said lower blade and engaging said lug and said lower blade at its opposite ends, a lower handle pivotally mounted in said housing portion, the pivot axis of said lower handle substantially intersecting the axis of said pin, said lower blade having a longitudinal slot therein centrally beneath said housing portion extending forwardly from approximately a location in transverse alignment with said pin, said upper blade having a hole therethrough aligned with said slot, and an actuator pin fixed in said lower handle and projecting freely through said hole and into said slot, said spring normally biasing said blades and said handles to spread apart open position, said actuator pin in said open position extending downwardly and forwardly through said hole and engaging the forward margin of said slot, said lower handle being movable to swing said actuator pin to a substantially vertical position engaging the rearward margin of said slot, said upper blade in the latter position of said pin overlying the lower blade throughout its length.

No references cited.